US012312560B2

(12) United States Patent
Schymitzek et al.

(10) Patent No.: US 12,312,560 B2
(45) Date of Patent: May 27, 2025

(54) TOILET RIM BLOCK HAVING AN IMPROVED GLOSS

(71) Applicant: Henkel AG & Co. KGaA, Duesseldorf (DE)

(72) Inventors: Tatiana Schymitzek, Krefeld (DE); Claudia Bartolucci, Moers (DE); Daniela Poethkow, Krefeld (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/589,607

(22) Filed: Jan. 31, 2022

(65) Prior Publication Data

US 2022/0251483 A1 Aug. 11, 2022

Related U.S. Application Data

(63) Continuation of application No. PCT/EP2020/071087, filed on Jul. 27, 2020.

(30) Foreign Application Priority Data

Jul. 30, 2019 (EP) .................................... 19189198

(51) Int. Cl.

| | |
|---|---|
| ***C11D 17/00*** | (2006.01) |
| ***C11D 1/83*** | (2006.01) |
| ***C11D 3/37*** | (2006.01) |
| ***C11D 17/04*** | (2006.01) |
| ***E03D 9/02*** | (2006.01) |
| *C11D 1/14* | (2006.01) |
| *C11D 1/22* | (2006.01) |
| *C11D 1/72* | (2006.01) |

(52) U.S. Cl.

CPC ............ *C11D 17/0056* (2013.01); *C11D 1/83* (2013.01); *C11D 3/3761* (2013.01); *C11D 17/046* (2013.01); *E03D 9/02* (2013.01); *C11D 1/143* (2013.01); *C11D 1/22* (2013.01); *C11D 1/721* (2013.01); *C11D 2111/24* (2024.01); *E03D 2009/024* (2013.01)

(58) Field of Classification Search

CPC .................................................. C11D 17/0056

See application file for complete search history.

(56) References Cited

U.S. PATENT DOCUMENTS

| | | | | |
|---|---|---|---|---|
| 4,460,490 | A * | 7/1984 | Barford | C11D 17/0082 252/186.25 |
| 5,863,876 | A | 1/1999 | Lance-Gomez et al. | |
| 6,376,442 | B1 * | 4/2002 | Perthuisot | C11D 3/50 510/447 |
| 7,585,825 | B2 * | 9/2009 | Artiga Gonzalez | C11D 1/72 510/315 |
| 2004/0072704 | A1 * | 4/2004 | Gerke | A61Q 13/00 510/101 |
| 2012/0047640 | A1 * | 3/2012 | Warkotsch | C11D 17/0056 510/192 |
| 2017/0218306 | A1 * | 8/2017 | Martinez-Crowley | C11D 3/10 |
| 2021/0040417 | A1 * | 2/2021 | Arlabosse | C11D 3/2079 |

FOREIGN PATENT DOCUMENTS

| | | | |
|---|---|---|---|
| CN | 102002444 | A | 4/2011 |
| DE | 4314659 | A1 | 10/1994 |
| DE | 102015215135 | A1 | 10/1994 |
| DE | 102008037723 | A1 | 2/2010 |
| EA | 19453 | B1 | 3/2014 |
| EP | 0791047 | B1 | 12/1998 |
| RU | 2673082 | C1 | 11/2018 |

OTHER PUBLICATIONS

European Search Report EP 19 18 9198 Completed: Feb. 18, 2020; Mailing Date: Feb. 25, 2020 pp. 4.

PCT International Search Report PCT/EP2020/071087 Completed: Sep. 22, 2020; Mailing Date: Oct. 2, 2020 pp. 2.

Application No. 2020 80052177.X Chinese Office Action Dated Nov. 6, 2023.

Zhang Qiaoming, Appeals to modern hard surface cleaning agents—convenience and surface safety, Daily Chemical Science, vol. 29, No. 1, pp. 31-32.

2022104954/4(010420) RU Office Action Dated Dec. 5, 2023.

* cited by examiner

*Primary Examiner* — Necholus Ogden, Jr.

(74) *Attorney, Agent, or Firm* — Bojuan Deng

(57) ABSTRACT

The invention relates to a solid toilet rim block, the toilet rim block including a surfactant system and a polymer, and the surfactant system being present in the total composition in an amount of less than 50 wt. %. The invention also relates to a system having such a toilet rim block.

17 Claims, No Drawings

TOILET RIM BLOCK HAVING AN IMPROVED GLOSS

FIELD OF THE INVENTION

The invention relates to a WC cleaning block, to a system comprising such a WC cleaning block, and to the use of same.

BACKGROUND OF THE INVENTION

In particular, spherical toilet rim blocks, also called toilet blocks, are enjoying growing popularity. It has been found that when a surfactant system is used in sufficiently large amounts, in particular in excess of 50 percent by weight of the total composition, an aesthetically pleasing gloss remains on the surface of the toilet bowl.

From an economic and ecological point of view, however, it is desirable to reduce the total amount of surfactant in the composition. However, a reduction in the amount of the surfactant system leads to a less appealing visual gloss impression on the toilet surface.

BRIEF SUMMARY OF THE INVENTION

It was therefore an object of the present invention to provide an economic and ecological toilet rim block which leaves an appealing visual gloss on the surface of the toilet.

According to one aspect of the invention, a toilet rim block is described, the toilet rim block comprising a surfactant system and a polymer, and the surfactant system being present in the total composition in an amount of less than 50 wt. %.

An economic and ecological toilet rim block is thus provided which leaves an appealing visual gloss on the surface of the toilet. In other words, the gloss can be provided on the surface even when an even smaller total amount of surfactant is used.

DETAILED DESCRIPTION OF THE INVENTION

According to a preferred embodiment, a toilet rim block is described in which the polymer is an acrylate-based polymer.

Since the polymer is an acrylate-based polymer, it reliably leaves a gloss on the surface of the toilet bowl.

According to a preferred embodiment, a toilet rim block is described, the toilet rim block having a substantially spherical geometry.

Uniform wetting of the surface of the toilet bowl is made possible in particular when the toilet rim block has good rinsing behavior. Due to the spherical geometry, the toilet rim block can be rinsed evenly, with the polymer being applied to the surface of the toilet bowl.

According to a preferred embodiment, a toilet rim block is described in which the surfactant system is present in the total composition in an amount of less than 40 wt. %.

According to a preferred embodiment, a toilet rim block is described in which the composition comprises at least one anionic surfactant, the total amount of anionic surfactant preferably being less than 40 wt. %.

According to another preferred embodiment, a toilet rim block is described in which the composition comprises at least one alkylbenzene sulfonate as the anionic surfactant, the total amount of anionic surfactant being less than 40 wt. % and the amount of alkylbenzene sulfonate preferably being less than 25 wt. %.

According to another preferred embodiment, a toilet rim block is described in which the composition comprises at least one olefin sulfonate as the anionic surfactant, the total amount of anionic surfactant being less than 40 wt. % and the amount of olefin sulfonate preferably being less than 15 wt. %.

According to another preferred embodiment, a toilet rim block is described in which the composition comprises at least one olefin sulfonate and at least one alkylbenzene sulfonate as the anionic surfactant, the total amount of anionic surfactant being less than 40 wt. % and the amount of alkylbenzene sulfonate preferably being less than 25 wt. %, and the amount of olefin sulfonate preferably being less than 15 wt. %.

According to a preferred embodiment, a toilet rim block is described in which the composition comprises a non-ionic surfactant in an amount of less than 8 wt. %.

According to another preferred embodiment, a toilet rim block is described in which the composition comprises at least one olefin sulfonate and at least one alkylbenzene sulfonate as the anionic surfactant, the total amount of anionic surfactant being less than 40 wt. % and the amount of alkylbenzene sulfonate preferably being less than 25 wt. %, and the amount of olefin sulfonate preferably being less than 15 wt. %, and in which the composition comprises a non-ionic surfactant in an amount of less than 8 wt. %.

According to another aspect, a system is described having a dispensing device and at least one toilet rim block according to one of the preceding points.

According to a preferred embodiment, a system is described comprising a dispensing device and at least two, more preferably at least three and even more preferably at least four of the toilet rim blocks, and these at least two, more preferably at least three and even more preferably at least four toilet rim blocks are arranged in a row next to one another.

Uniform and in particular complete wetting of the surface of the toilet bowl is made possible in particular when the flushing water is applied to the largest possible parts of the surface of the toilet bowl. This is made possible by the fact that at least two, more preferably at least three and even more preferably at least four toilet rim blocks are arranged in a row next to one another. The row arrangement of a plurality of toilet rim blocks is particularly preferred, since this allows a broad "water front" to be generated which comprises a dissolved toilet rim block composition and can wet the largest possible parts of the surface of the toilet bowl. It is particularly preferred if the toilet rim blocks also have a spherical geometry, since these also demonstrate particularly good rinsing behavior.

According to another aspect, the use of a polymer for improving gloss in a toilet rim block is described.

In particular, the use of a polymer for improving gloss is described, the polymer being an acrylate-based polymer.

According to another aspect, the use for improving gloss by means of a system is described, the system having a dispensing device and at least two, more preferably at least three and even more preferably at least four of the toilet rim blocks, and these at least two, more preferably at least three and even more preferably at least four toilet rim blocks are arranged in a row next to each other.

The row arrangement of a plurality of toilet rim blocks is particularly preferred, since this allows a broad "water front" to be generated which comprises a dissolved toilet rim block composition and can wet the largest possible parts of the surface of the toilet bowl. It is particularly preferred if the toilet rim blocks also have a spherical geometry, since these also demonstrate particularly good rinsing behavior. The use of such a system for improving gloss is therefore particularly preferred.

The WC cleaning block according to the invention is usually used in a dispensing device, such as what is referred to as a WC basket. This invention therefore also relates to a system consisting of at least one WC cleaning block according to the invention and a dispensing device.

The WC cleaning block according to the invention can be produced in a process which comprises the steps of mixing the ingredients, extruding the mixture, cutting the extruded strand into portion pieces of a defined mass, and shaping said pieces to form rotationally symmetrical bodies.

The invention therefore also relates to a process for producing a rotationally symmetrical WC cleaning block, which contains perfume, non-ionic surfactant, alkylbenzene sulfonate and olefin sulfonate, comprising the steps of:

a) mixing the ingredients;
b) extruding the mixture;
c) cutting the extruded strand into portion pieces of a defined mass; and
d) shaping said pieces to form rotationally symmetrical bodies.

The system according to the invention consisting of the WC cleaning block and the dispensing device can in addition be used in a process for cleaning and/or fragrancing and/or disinfecting flush toilets, in such a way that the dispensing device filled with the WC cleaning block is hooked into the WC bowl and, when the toilet flush is actuated, dissolved ingredients of the WC cleaning block enter the flushing water and can there produce their cleaning and/or fragrancing and/or disinfecting effect. The invention also relates to a process for cleaning and/or fragrancing and/or disinfecting flush toilets using a system consisting of a WC cleaning block according to the invention and a dispensing device.

Substances that are also used as ingredients of cosmetic agents are also designated in the following according to the International Nomenclature of Cosmetic Ingredients (INCI) as appropriate. Chemical compounds have an English INCI name, botanical ingredients are listed exclusively in Latin, in accordance with Linné, and what are known as common names such as “water,” “honey” or “sea salt” are also specified in Latin. The INCI names can be found in the International Cosmetic Ingredient Dictionary and Handbook—Seventh Edition (1997), which is published by The Cosmetic, Toiletry, and Fragrance Association (CTFA), 1101 17th Street, NW, Suite 300, Washington D.C. 20036, USA and contains over 9,000 INCI names and references to over 37,000 trade names and technical names, including the associated distributors from over 31 countries. The International Cosmetic Ingredient Dictionary and Handbook assigns to the ingredients one or more chemical classes, for example Polymeric Ethers, and one or more functions, for example Surfactants—Cleansing Agents, which it then explains in greater detail and to which reference may also subsequently be made.

The expression CAS means that the following numerical sequence is a designation of the Chemical Abstracts Service.

In the scope of the present invention, unless otherwise stated, fatty acids or fatty alcohols or the derivatives thereof represent branched or unbranched carboxylic acids or alcohols or the derivatives thereof preferably having 6 to 22 carbon atoms, in particular 8 to 20 carbon atoms, particularly preferably 10 to 18 carbon atoms, most preferably 12 to 16 carbon atoms, for example 12 to 14 carbon atoms. The former are particularly preferred for ecological reasons on account of the vegetable basis thereof, based on sustainable raw materials, but the teaching according to the invention is not restricted thereto. In particular, the oxo alcohols and the derivatives thereof which can be obtained, for example, according to Roelen’s oxo synthesis and which preferably comprise 7 to 19 carbon atoms, in particular 9 to 19 carbon atoms, particularly preferably 9 to 17 carbon atoms, most preferably 11 to 15 carbon atoms, for example 9 to 11, 12 to 15 or 13 to 15 carbon atoms, can be used accordingly.

Perfume

The agent contains one or more fragrances, preferably in an amount of 0.01 to 10 wt. %, in particular 0.05 to 8 wt. %, particularly preferably 0.1 to 5 wt. %. D-limonene can be contained as a perfume component. In a particularly preferred embodiment, the WC cleaning block according to the invention contains a perfume consisting of essential oils. For example pine, citrus, jasmine, patchouli, rose, or ylang-ylang oil can be used as said oils within the meaning of the invention. Clary sage oil, chamomile oil, lavender oil, clove oil, melissa oil, mint oil, cinnamon leaf oil, lime blossom oil, juniper berry oil, vetiver oil, olibanum oil, *galbanum* oil, and labdanum oil, as well as orange blossom oil, neroli oil, orange peel oil, and sandalwood oil are also suitable.

If it is to be perceptible, an odorant has to be volatile, with the molar mass, in addition to the nature of the functional groups and the structure of the chemical compound, also playing an important role. Therefore, most odorants have molar masses of up to approximately 200 daltons, while molar masses of 300 daltons and above are something of an exception. Due to the differing volatility of odorants, the odor of a perfume composed of a plurality of odorants varies during evaporation, the odor impressions being divided into “top note,” “middle note or body” and “end note or dry out.”

Examples of adherent odorants that can advantageously be used in the perfume oils within the scope of the present invention are essential oils such as *Angelica* root oil, anise oil, *Arnica* blossom oil, basil oil, bay oil, *Champaca* blossom oil, *Abies alba* oil, *Abies alba* cone oil, elemi oil, *Eucalyptus* oil, fennel oil, spruce needle oil, *Galbanum* oil, *Geranium* oil, ginger grass oil, guaiac wood oil, gurjun balsam oil, *Helichrysum* oil, ho oil, ginger oil, iris oil, cajeput oil, *Calamus* oil, chamomile oil, camphor oil, *Cananga* oil, cardamom oil, *Cassia* oil, pine needle oil, *Copaiba* balsam oil, coriander oil, spearmint oil, caraway oil, cumin oil, lemon grass oil, musk seed oil, myrrh oil, clove oil, neroli oil, *Niaouli* oil, olibanum oil, oregano oil, palmarosa oil, patchouli oil, balsam Peru oil, petitgrain oil, pepper oil, peppermint oil, allspice oil, pine oil, rose oil, rosemary oil, sandalwood oil, celery oil, star anise oil, *Thuja* oil, thyme oil, *Verbena* oil, vetiver oil, juniper berry oil, wormwood oil, wintergreen oil, ylang-ylang oil, hyssop oil, cinnamon oil, cinnamon leaf oil and cypress oil.

However, higher-boiling and solid odorants of natural or synthetic origin may also advantageously be used in the perfume oils, within the scope of the present invention, as adherent odorants or odorant mixtures. These compounds include the compounds indicated in the following and mixtures thereof: ambrettolide, α-amylcinnamaldehyde, anethole, anisaldehyde, anise alcohol, anisole, anthranilic acid methyl ester, acetophenone, benzyl acetone, benzaldehyde, benzoic acid ethyl ester, benzophenone, benzyl alcohol, borneol, bornyl acetate, α-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptyne carboxylic acid methyl ester, heptaldehyde, hydroquinone dimethyl ether, hydroxycinnamaldehyde, hydroxycinnamyl alcohol, indole, irone, isoeugenol, isoeugenol methyl ether, isosafrole, jasmone, camphor, carvacrol, carvone, p-cresol methyl ether, coumarin, p-methoxyacetophenone, methyl n-amyl ketone, methyl anthranilic acid methyl ester, p-methyl acetophenone, methyl chavicol, p-methyl quinoline, methyl β-naphthyl ketone, methyl n-nonyl acetaldehyde, methyl n-nonyl ketone, muscone, β-naphthol ethyl ether, β-naphthol methyl ether, nerol, nitrobenzene, n-nonyl aldehyde, nonyl alcohol, n-octyl aldehyde, p-oxyacetophenone, pentadecanolide, β-phenyl ethyl alcohol, phenyl acetaldehyde dimethyl acetal, phenylacetic acid, pulegone, safrole, salicylic acid isoamyl ester, salicylic acid methyl ester, salicylic acid hexyl ester, salicylic acid cyclohexyl ester, santalol, skatole, terpineol, thymene, thymol, γ-undecalactone, vanillin, veratrum aldehyde, cinnamaldehyde, cinnamyl alcohol, cinnamic acid, cinnamic acid ethyl ester, and cinnamic acid benzyl ester.

More volatile odorants that can advantageously be used in the perfume oils within the scope of the present invention include in particular lower-boiling odorants of natural or synthetic origin, which may be used alone or in mixtures. Examples of more volatile odorants are alkyl isothiocyanates (alkyl mustard oils), butanedione, limonene, linalool, linalyl acetate and propionate, menthol, menthone, methyl-n-heptenone, phellandrene, phenylacetaldehyde, terpinyl acetate, citral and citronellal.

Surfactants

The WC cleaning block according to the invention contains at least one non-ionic surfactant as well as at least one alkylbenzene sulfonate and at least one olefin sulfonate. Further surfactants can also be contained.

Preferred alkylbenzene sulfonates are in particular those having approximately 12 C atoms in the alkyl moiety, such as linear sodium-C10-13-alkylbenzene sulfonate. Preferred olefin sulfonates have a carbon chain length of 14 to 16. The WC cleaning block according to the invention preferably contains 10 to 70 wt. %, more preferably 20 to 65 wt. %, particularly preferably 20 to 30 wt. %, alkylbenzene sulfonate, and preferably 10 to 30 wt. %, more preferably 15 to 30 wt. %, particularly preferably 15 to 25 wt. %, olefin sulfonate.

Non-Ionic Surfactants

Non-ionic surfactants within the scope of the invention can be alkoxylates such as polyglycol ethers, fatty alcohol polyglycol ethers, alkylphenol polyglycol ethers, end-capped polyglycol ethers, mixed ethers and hydroxy mixed ethers and fatty acid polyglycol esters. Ethylene oxide-propylene oxide block polymers, fatty acid alkanolamides and fatty acid polyglycol ethers can also be used. A further significant class of non-ionic surfactants that can be used according to the invention are polyol surfactants and here, in particular, glycol surfactants such as alkyl polyglycosides and fatty acid glucamides. Alkyl polyglycosides, in particular alkyl polyglucosides, and in particular fatty alcohol alkoxylates (fatty alcohol polyglycol ethers) are particularly preferred.

Preferred fatty alcohol alkoxylates are ethylene oxide (EO)- and/or propylene oxide (PO)-alkoxylated, unbranched or branched, saturated or unsaturated C8-22 alcohols having a degree of alkoxylation of up to 30, preferably ethoxylated C12-22 fatty alcohols having a degree of ethoxylation of less than 30, in particular 12 to 28, preferably 20 to 28, particularly preferably 25, for example C16-18 fatty alcohol ethoxylates having 25 EO.

Alkyl polyglycosides are surfactants that can be obtained by reacting sugars and alcohols according to the relevant processes of preparative organic chemistry, the mixture being one of monoalkylated, oligomeric or polymeric sugars, depending on the type of production. Preferred alkyl polyglycosides are alkyl polyglucosides, the alcohol particularly preferably being a long-chain fatty alcohol or a mixture of long-chain fatty alcohols and branched or unbranched C8- to C18 alkyl chains and the degree of oligomerization (DP) of the sugars being between 1 and 10, in particular 1 to 6, preferably 1.1 to 3, most preferably 1.1 to 1.7, for example C8-10-alkyl-1.5-glucoside (DP of 1.5).

Fatty alcohol ethoxylates are preferably used in amounts of up to 20 wt. %, particularly preferably 4 to 12 wt. %, more particularly preferably 7 to 9 wt. %. In addition, further non-ionic surfactants such as fatty acid monoalkanolamides and/or alkyl polyglycosides can be contained in amounts of up to 10 wt. %.

Further Anionic Surfactants

Aliphatic sulfates such as fatty alcohol sulfates, fatty alcohol ether sulfates, dialkyl ether sulfates, monoglyceride sulfates and aliphatic sulfonates such as alkane sulfonates, ether sulfonates, n-alkyl ether sulfonates, ester sulfonates and lignosulfonates can be in the WC cleaning block according to the invention as further anionic surfactants. Likewise, fatty acid cyanamides, sulfosuccinates (sulfosuccinic acid esters), in particular sulfosuccinic acid mono- and di-C8-C18 alkyl esters, sulfosuccinamates, sulfosuccinamides, fatty acid isethionates, acylamino alkane sulfonates (fatty acid taurides), fatty acid sarcosinates, ether carboxylic acids and alkyl (ether) phosphates, and α-sulfo fatty acid salts, acylglutamates, monoglyceride disulfates and alkyl ethers of glycerol disulfate can also be used within the scope of the present invention.

Fatty alcohol sulfates and/or fatty alcohol ether sulfates, in particular fatty alcohol sulfates, are preferred within the scope of the present invention. Fatty alcohol sulfates are products of sulfation reactions on corresponding alcohols, while fatty alcohol ether sulfates are products of sulfation reactions on alkoxylated alcohols. A person skilled in the art generally understands alkoxylated alcohols to be the reaction products of alkylene oxide, preferably ethylene oxide, with alcohols, preferably with longer-chain alcohols within the meaning of the present invention. In general, a complex mixture of addition products of different degrees of ethoxylation is created from n moles of ethylene oxide and one mole of alcohol, depending on the reaction conditions. Another embodiment of the alkoxylation consists in using mixtures of alkylene oxides, preferably the mixture of ethylene oxide and propylene oxide. The sulfates of low-ethoxylated fatty alcohols having 1 to 4 ethylene oxide units (EO), in particular 1 to 2 EO, e.g., 1.3 EO, are preferred fatty alcohol ether sulfates.

The anionic surfactants are preferably used as sodium salts, but can also be contained as other alkali or alkaline-earth metal salts, for example magnesium salts, and in the form of ammonium salts or mono-, di-, tri- or tetraalkylammonium salts, and in the case of the sulfonates, also in the form of their corresponding acids, e.g., dodecylbenzenesulfonic acid.

In addition to the types of surfactants mentioned thus far, the agent according to the invention can in addition also contain cationic surfactants and/or amphoteric surfactants.

Suitable amphoteric surfactants are, for example, betaines of the formula $(R^{iii})(R^{iv})(R^{v})N^{+}CH2COO^{-}$, in which $R^{iii}$ denotes an alkyl group, which is optionally interrupted by heteroatoms or heteroatom groups, having 8 to 25, preferably 10 to 21, carbon atoms, and $R^{iv}$ and $R^{v}$ denote identical or different alkyl groups having 1 to 3 carbon atoms, in particular C10-C18 alkyl dimethyl carboxymethyl betaine and C11-C17 alkyl amidopropyl dimethyl carboxymethyl betaine.

Suitable cationic surfactants are, inter alia, the quaternary ammonium compounds of the formula $(R^{vi})(R^{vii})(R^{viii})(R^{ix})N^{+}X^{-}$, in which $R^{vi}$ to $R^{ix}$ are four identical or different, in particular two long-chain and two short-chain, alkyl groups, and $X^{-}$ is an anion, in particular a halide ion, for example didecyl dimethyl ammonium chloride, alkyl benzyl didecyl ammonium chloride and the mixtures thereof.

Further Ingredients

In addition to the components mentioned thus far, the WC cleaning block according to the invention can contain further ingredients that are usually used in WC cleaning blocks, preferably selected from the group comprising acids, bases, salts, thickening agents, antimicrobial active ingredients, preservatives, complexing agents, polymers, dyes, fragrances, perfume boosters, fillers, builders, bleaching agents, corrosion inhibitors, rinsing regulators, enzymes, microorganisms, active ingredients for inhibiting limescale deposits, active ingredients for reducing dirt adhesion, active ingredients for improving workability, active ingredients for reducing adhesiveness, and mixtures thereof. Overall, no more than 60 wt. %, preferably 0.01 to 60 wt. %, in particular 0.2 to 15 wt. %, of further ingredients should be contained.

Acids

WC cleaning blocks according to the invention can contain one or more acids and/or the salts thereof in order to increase the cleaning performance on limescale and urine deposits. The acids are preferably produced from renewable raw materials. Therefore, in particular organic acids, such as formic acid, acetic acid, citric acid, glycolic acid, lactic acid, succinic acid, adipic acid, malic acid, tartaric acid and gluconic acid, and mixtures thereof, are suitable as acids. In addition, however, the inorganic acids hydrochloric acid, sulfuric acid, phosphoric acid and nitric acid, or also sulfamic acid or mixtures thereof, can also be used. The acids and/or salts thereof selected from the group comprising citric acid, lactic acid, formic acid, the salts thereof, and mixtures thereof are particularly preferred. Said acids and/or salts are used in amounts of 0.01 to 10 wt. %, particularly preferably 0.2 to 5 wt. %.

In a preferred embodiment, the agent in addition contains inorganic salts, preferably alkali- or alkaline-earth metal salts, in particular carbonates, sulfates, halides or phosphates, and mixtures thereof. Particularly preferably, sodium sulfate and/or sodium carbonate are used. Sodium sulfate can be contained in an amount of up to 60 wt. %, preferably 0.01 to 60 wt. %, particularly preferably 20 to 60 wt. %, in particular 35 to 55 wt. %. Sodium carbonate and further salts can be contained in an amount of up to 30 wt. %, preferably up to 10 wt. %, particularly preferably up to 5 wt. %.

Bases

Further alkalis can be contained in agents according to the invention. Bases from the group of the alkali- and alkaline-earth metal hydroxides and carbonates, in particular sodium carbonate or sodium hydroxide, are preferably used as bases in agents according to the invention. In addition, however, ammonia and/or alkanolamines having up to 9 C atoms in the molecule, preferably the ethanolamines, in particular monoethanolamine, can also be used.

Antimicrobial Active Ingredients

Disinfection and sanitation are a particular form of cleaning. In a corresponding particular embodiment of the invention, the WC cleaning block therefore contains one or more antimicrobial active ingredients, preferably in an amount of 0.01 to 1 wt. %, more preferably 0.02 to 0.8 wt. %, in particular 0.05 to 0.5 wt. %, particularly preferably 0.1 to 0.3 wt. %, most preferably 0.2 wt. %. The terms "disinfection," "sanitation," "antimicrobial effect" and "antimicrobial active ingredient" have the conventional meaning thereof within the scope of the teaching according to the invention. While disinfection, in the narrower sense of medical practice, means killing—theoretically all—infectious germs, sanitation is to be understood as eliminating, as far as possible, all germs, including saprophytic germs that are usually harmless to humans. In this case, the extent of the disinfection or sanitation depends on the antimicrobial effect of the agent used, which effect reduces as the content of antimicrobial active ingredient decreases or as the agent to be used becomes increasingly diluted.

For example, antimicrobial active ingredients from the groups of the alcohols, aldehydes, antimicrobial acids and the salts thereof, carboxylic acid esters, acid amides, phenols, phenol derivatives, diphenyls, diphenyl alkanes, urea derivatives, oxygen and nitrogen acetals and methylals, benzamidines, isothiazoles and the derivatives thereof, such as isothiazolins and isothiazolinones, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl-butyl-carbamate, iodine, iodophors, compounds which release active chlorine, and peroxides are suitable according to the invention. Preferred antimicrobial active ingredients are preferably selected from the group comprising ethanol, n-propanol, i-propanol, 1,3-butanediol, phenoxyethanol, 1,2-propylene glycol, glycerol, undecylenic acid, citric acid, lactic acid, benzoic acid, salicylic acid, thymol, 2-benzyl-4-chlorophenol, 2,2'-methylene-bis-(6-bromo-4-chlorophenol), 2,4,4'-trichloro-2'-hydroxydiphenyl ether, N-(4-chlorophenyl)-N'-(3,4-dichlorophenyl)-urea, N,N'-(1,10-decandiyldi-1-pyridinyl-4-ylidene)-bis-(1-octanamine)-dichloride, N,N'-bi s-(4-chlorophenyl)-3,12-diimino-2,4,11,13-tetraazatetradecandiimidamide, antimicrobial quaternary surface-active compounds, guanidines and sodium dichloroisocyanurate (DCI, 1,3-dichloro-5H-1,3,5-triazine-2,4,6-trione sodium salt). Preferred antimicrobially acting surface-active quaternary compounds contain an ammonium, sulfonium, phosphonium, iodonium or arsonium group. Furthermore, antimicrobially acting essential oils can also be used, which oils simultaneously fragrance the cleaning agent. Particularly preferred antimicrobial active ingredients are, however, selected from the group comprising salicylic acid, quaternary surfactants, in particular benzalkonium chloride, peroxo compounds, in particular hydrogen peroxide, alkali metal hypochlorite, sodium dichloroisocyanurate and mixtures thereof.

Preservatives

WC cleaning blocks according to the invention can also contain preservatives. The substances mentioned under the antimicrobial active ingredients can substantially be used as preservatives of this kind.

Complexing Agents

Complexing agents (INCI chelating agents), also referred to as sequestering agents, are ingredients which allow metal ions to complex and to become inactive in order to prevent disadvantageous effects of said ions on the stability or the appearance of the agent, for example cloudiness. It is important to complex the calcium and magnesium ions of the water hardness, which ions are incompatible with many ingredients. However, complexing ions of heavy metals such as iron or copper delays the oxidative decomposition of the finished agents. In addition, the complexing agents assist with the cleaning effect.

For example, the following complexing agents, named in accordance with INCI, are suitable: aminotrimethylene phosphonic acid, beta-alanine diacetic acid, calcium disodium EDTA, citric acid, cyclodextrin, cyclohexanediamine tetraacetic acid, diammonium citrate, diammonium EDTA, diethylenetriamine pentamethylene phosphonic acid, dipotassium EDTA, disodium azacycloheptane diphosphonate, disodium EDTA, disodium pyrophosphate, EDTA, etidronic acid, galactaric acid, gluconic acid, glucuronic acid, HEDTA, hydroxypropyl cyclodextrin, methyl cyclodextrin, pentapotassium triphosphate, pentasodium aminotrimethylene phosphonate, pentasodium ethylenediamine tetramethylene phosphonate, pentasodium pentetate, pentasodium triphosphate, pentetic acid, phytic acid, potassium citrate, potassium EDTMP, potassium gluconate, potassium polyphosphate, potassium trisphosphonomethylamine oxide, ribonic acid, sodium chitosan methylene phosphonate, sodium citrate, sodium diethylenetriamine pentamethylene phosphonate, sodium dihydroxyethylglycinate, sodium EDTMP, sodium gluceptate, sodium gluconate, sodium glycereth-1 polyphosphate, sodium hexametaphosphate, sodium metaphosphate, sodium metasilicate, sodium phytate, sodium polydimethylglycinophenolsulfonate, sodium trimetaphosphate, TEA-EDTA, TEA-polyphosphate, tetrahydroxyethyl ethylenediamine, tetrahydroxypropyl ethylenediamine, tetrapotassium etidronate, tetrapotassium pyrophosphate, tetrasodium EDTA, tetrasodium etidronate, tetrasodium pyrophosphate, tripotassium EDTA, trisodium dicarboxymethyl alaninate, trisodium EDTA, trisodium HEDTA, trisodium NTA and trisodium phosphate.

Polymers

The WC cleaning block according to the invention can additionally contain polymers. Said polymers can, for example, reduce calcification and the tendency to become resoiled.

Acrylic polymers, such as those which are commercially available from the company Rhodia under the trade name Mirapol, are preferred polymers.

Fragrances and Dyes

The WC cleaning block according to the invention can contain one or more fragrances and/or one or more dyes (INCI colorants) as further ingredients. Water-soluble and oil-soluble dyes can be used as dyes, it being important that the compatibility with further ingredients, for example bleaching agents, is taken into account and that the dye used should not significantly affect the WC ceramics, even after long-term use. The dyes are preferably contained in an amount of 0.0001 to 0.1 wt. %, in particular 0.0005 to 0.05 wt. %, particularly preferably 0.001 to 0.01 wt. %.

Builders

Water-soluble and/or water-insoluble builders can optionally be used in the WC cleaning blocks according to the invention. Water-soluble builders are preferred since they are generally less likely to form insoluble residues on hard surfaces. Conventional builders which may be added within the scope of the invention are low-molecular-weight polycarboxylic acids and the salts thereof, homopolymeric and copolymeric polycarboxylic acids and the salts thereof, citric acid and the salts thereof, carbonates, phosphates and silicates. The category of water-insoluble builders includes zeolites, which may also be used, and mixtures of the aforementioned builders.

Bleaching Agents

According to the invention, bleaching agents can be added to the cleaning agent. Suitable bleaching agents include peroxides, peroxy acids and/or perborates, hydrogen peroxide being particularly preferred. In contrast, sodium hypochlorite is less suitable in the case of cleaning agents having an acidic formulation, on account of the release of poisonous chlorine gas vapor, but can be used in cleaning agents adjusted to alkaline. In some circumstances, a bleach activator may also be required in addition to the bleaching agent.

Corrosion Inhibitors

Suitable corrosion inhibitors (INCI corrosion inhibitors) are, for example, the following substances, named in accordance with INCI: cyclohexylamine, diammonium phosphate, dilithium oxalate, dimethylamino methylpropanol, dipotassium oxalate, dipotassium phosphate, disodium phosphate, disodium pyrophosphate, disodium tetrapropenyl succinate, hexoxyethyl diethylammonium, phosphate, nitromethane, potassium silicate, sodium aluminate, sodium hexametaphosphate, sodium metasilicate, sodium molybdate, sodium nitrite, sodium oxalate, sodium silicate, stearamidopropyl dimethicone, tetrapotassium pyrophosphate, tetrasodium pyrophosphate, and triisopropanolamine.

Rinsing Regulators

The substances referred to as rinsing regulators are primarily used to control the consumption of the agent during use such that the intended service life is met. Solid long-chain fatty acids such as stearic acid, but also salts of such fatty acids, fatty acid ethanolamides, such as coconut fatty acid monoethanolamide, or solid polyethylene glycols, such as those having molecular weights of between 10,000 and 50,000, are preferably suitable as regulators.

Active Ingredients for Reducing Stickiness

In order to improve the workability when producing the WC cleaning block according to the invention, an active ingredient can be used to reduce the adhesiveness. For instance, adding dolomite powder or titanium dioxide powder having a fine particle size distribution improves the processing behavior in spherical forms and significantly reduces wear and stickiness.

The results using active ingredients of this kind are better than using other conventional measures such as coating the spheres with a lubricant, or powdering or coating the forming rolls with Teflon.

Enzymes

The agent can also contain enzymes, preferably proteases, lipases, amylases, hydrolases and/or cellulases. They can be added to the agent according to the invention in any form established according to the prior art. These include solutions of the enzymes, advantageously as concentrated as possible, low in water and/or mixed with stabilizers. Alternatively the enzymes can also be encapsulated, for example by spray-drying or extruding the enzyme solution together with a preferably natural polymer or in the form of capsules, for example those in which the enzymes are enclosed in a solidified gel, or in the form of the core-shell type in which an enzyme-containing core is coated with a water-, air-, and/or chemical-impermeable protective layer. Other active ingredients such as stabilizers, emulsifiers, pigments, bleaching agents, or dyes can additionally be applied in overlaid layers. Such capsules are applied using methods that are known per se, for example by shaking or roll granulation or in fluidized bed processes. Advantageously, such granules are low in dust, for example due to the application of polymeric film-formers, and stable in storage due to the coating. Furthermore, enzyme stabilizers can be present in enzyme-containing agents in order to protect an enzyme contained in an agent according to the invention from damage, for example inactivation, denaturation, or decomposition caused, e.g., by physical influences, oxidation, or proteolytic cleavage. Depending on the enzyme used in each case, suitable enzyme stabilizers are in particular: benzamidine hydrochloride, borax, boric acid, boronic acid or the salts or esters thereof, in particular derivatives having aromatic groups, such as substituted phenylboronic acids or the salts or esters thereof; peptide aldehydes (oligopeptides having a reduced C-terminus), amino alcohols such as mono-, di-, triethanol- and -propanolamine and the mixtures thereof, aliphatic carboxylic acids up to C12, such as succinic acid, other dicarboxylic acids or salts of the mentioned acids; end-capped fatty acid amide alkoxylates; low aliphatic alcohols and in particular polyols, for example glycerol, ethylene glycol, propylene glycol or sorbitol; and reducing agents and antioxidants such as sodium sulfite and reducing sugars. Further suitable stabilizers are known from the prior art. Preferably, combinations of stabilizers are used, for example the combination of polyols, boric acid and/or borax, the combination of boric acid or borate, reducing salts and succinic acid or other dicarboxylic acids, or the combination of boric acid or borate with polyols or polyamino compounds and with reducing salts.

Multi-Layer WC Cleaning Blocks

It is known from the prior art, for example EP 791047B1, to produce WC cleaning blocks from masses of different compositions, with one of the masses being wholly or partially enclosed by the other mass or masses. For example, the inner mass may have a higher perfume concentration than the outer one in order to ensure a fragrance impression which remains constant as the sphere mass decreases during use, or the inner mass contains a fragrance different from the outer one. In addition, different active ingredients can also be incorporated into different layers and released at different times depending on the degree of rinsing. Such a layered structure is also possible in the WC cleaning block according to the invention.

The almost ideal spherical shape of the WC cleaning block achieves uniform rinsing of the WC cleaning block such that the WC cleaning block substantially maintains its spherical form even during and/or after the rinsing processes and corresponding wear of the WC cleaning block. It has been shown that in particular a high sphericity w of the WC cleaning block at the beginning of the flushing water application is of crucial importance for maintaining the spherical form during or after the rinsing processes.

The diameter of the spherical toilet rim block is preferably between 1 mm and 10 cm, preferably between 5 mm and 5 cm, particularly preferably between 1 cm and 3 cm.

The WC cleaning block is inserted into a dispensing device that is fastened to the edge of the WC bowl by means of a holder. For this purpose, baskets which have a flushing water distributing element, as already described in the prior art, for example in DE 102008037723, and which can accommodate one or more WC cleaning blocks, are suitable. The WC cleaning block according to the invention and the dispensing device together form a system. Said system can accordingly be used in a process for cleaning and/or fragrancing and/or disinfecting flush toilets, in such a manner that the dispensing device filled with the WC cleaning block is hooked into the WC bowl and, when the toilet flush is actuated, dissolved ingredients of the WC cleaning block enter the flushing water and can there produce their cleaning and/or fragrancing and/or disinfecting effect.

In a preferred embodiment, the WC basket according to the invention is provided with a child-proof lock in order to prevent improper use of the spherical WC cleaning blocks according to the invention.

The WC cleaning block according to the invention is produced in a process which comprises the steps of:

a) mixing the ingredients;
b) extruding the mixture;
c) cutting the extruded strand into portion pieces of a defined mass; and
d) shaping said pieces to form rotationally symmetrical bodies. The shaping d) preferably takes place in a sphere rolling machine or in a press. Other suitable forming processes are casting and calendering. Steps a) and b) can also be combined, i.e., mixing the ingredients in the extruder. The process steps are optionally carried out at different temperatures, and therefore heating or cooling steps may be interposed between the steps. This is at the discretion of a person skilled in the art.

In a preferred embodiment, after one of steps b) or c), another process step is carried out in which the extruded strand is provided with a lubricant. For this purpose, a sponge, in the form of a wheel, that is permanently filled with the lubricant is guided over the extruded strand such that lubricant is applied to all or part of the surface, preferably to between 10 and 40% thereof. In this case, adding the lubricant improves the subsequent sphere formation. Suitable lubricants are in particular substances that are used for example as surfactants or rinsing regulators in formulations according to the invention. A lubricant selected from the group comprising dipropylene glycol, paraffins, non-ionic surfactants, polyethylene glycol and mixtures thereof, in particular dipropylene glycol, is particularly preferably used.

It is particularly preferred if the WC cleaning block has a spherical form having a sphericity ψ between 0.8 and 1, particularly preferably between 0.85 and 1, very particularly preferably between 0.9 and 1.

Embodiments

A WC cleaning block according to the invention having the formulation E1 was produced. In addition, further formulations C1 and C2 not according to the invention were produced. In all compositions, attempts were made to extrude the mixtures, cut pieces of a defined mass from the extrusion strand and then form said pieces into spheres using a rolling machine.

The compositions E1, C1 and C2 can be found in the table below. All quantities are in wt. %:

| Components: | C1 | C2 | E1 |
|---|---|---|---|
| Alkyl benzene sulfonic acid, Na-salt | 26.00 | 22.10 | 22.10 |
| Olefin sulfonate Na C14-16 | 18.00 | 11.40 | 11.40 |
| Fatty alcohol ethoxylate C16-18 25EO | 8.00 | 6.00 | 6.00 |
| Trisodium citrate dihydrate | 1.00 | 0.80 | 0.80 |
| Dye | <1 | <1 | <1 |
| Perfume Out of The Blue 2017 | <1 | <1 | <1 |
| Mirapol Surf S 600 | – | – | 0.1 |
| Dipropylene glycol | 0 | 0.3 | 0.3 |
| Filler (Na2 sulfate) | remainder | remainder | remainder |
| Gloss | + | – | + |
| Surfactant content | – | – | + |

Only the composition according to the invention was able to provide good gloss and simultaneously had a low total surfactant content.

What is claimed is:

1. A solid toilet rim block comprising a composition, wherein the composition comprises:

a surfactant system present in an amount of less than 50 wt. %, based on the total weight of the composition, wherein the surfactant system comprises an alkyl benzene sulfonic acid sodium salt, an olefin sulfonate sodium salt, and a fatty alcohol ethoxylate, and an acrylate-based polymer present in an amount of 0.1 wt. %, based on the total weight of the composition, wherein the composition does not comprise a carbonate.

2. The solid toilet rim block of claim 1, wherein the solid toilet rim block has a spherical geometry.

3. The solid toilet rim block of claim 1, wherein the surfactant system is present in an amount of less than 40 wt. %, based on the total weight of the composition.

4. The solid toilet rim block of claim 1, wherein the surfactant system further comprises an anionic surfactant present in an amount of less than 40 wt. %, based on the total weight of the composition.

5. The solid toilet rim block of claim 1, wherein the surfactant system further comprises a non-ionic surfactant present in an amount of less than 8 wt. %, based on the total weight of the composition.

6. A system comprising:

a dispensing device; and at least one of the solid toilet rim block of claim 1 arranged in the dispensing device.

7. The system of claim 6, wherein the at least one of the solid toilet rim block comprises at least two of the solid toilet rim blocks arranged adjacent one another in the dispensing device.

8. The system of claim 7, wherein the at least one of the solid toilet rim block comprises at least three of the solid toilet rim blocks arranged adjacent one another in the dispensing device.

9. The system of claim 8, wherein the at least one of the solid toilet rim block comprises at least four of the solid toilet rim blocks arranged adjacent one another in the dispensing device.

10. The solid toilet rim block of claim 1, wherein the surfactant system comprises the alkyl benzene sulfonic acid sodium salt in an amount of 22.1 wt. %, the olefin sulfonate sodium salt in an amount of 11.4 wt. %, and the fatty alcohol ethoxylate in an amount of 6 wt. %, based on the total weight of the composition.

11. A solid toilet rim block composition, comprising:

a surfactant system comprising:

an anionic surfactant comprising at least one olefin sulfonate, wherein the anionic surfactant is present in an amount of less than 40 wt. %, based on the total weight of the composition; and a non-ionic surfactant present in an amount of less than 8 wt. %, based on the total weight of the composition; and an acrylate-based polymer present in an amount of 0.1 wt. %, based on the total weight of the composition, wherein the composition does not comprise a carbonate.

12. The solid toilet rim block composition of claim 11, wherein the anionic surfactant further comprises at least one alkylbenzene sulfonate.

13. The solid toilet rim block composition of claim 12, wherein the at least one alkylbenzene sulfonate is present in an amount of less than 25 wt. %, based on the total weight of the composition.

14. The solid toilet rim block composition of claim 11, wherein the at least one olefin sulfonate is present in an amount of less than 15 wt. %, based on the total weight of the composition.

15. The solid toilet rim block composition of claim 11, wherein the anionic surfactant further comprises an alkyl benzene sulfonic acid sodium salt and an olefin sulfonate sodium salt, and wherein the non-ionic surfactant comprises a fatty alcohol ethoxylate.

16. A system comprising:

a dispensing device; and at least one solid toilet rim block comprising the solid toilet rim block composition of claim 11 arranged in the dispensing device.

17. The system of claim 16, wherein the at least one of the solid toilet rim block comprises at least two of the solid toilet rim blocks adjacent one another in the dispensing device.

* * * * *